US00RE45816E

(19) United States
(12) Reissued Patent
Andre et al.

(10) Patent Number: US RE45,816 E
(45) **Date of Reissued Patent: *Dec. 8, 2015**

(54) ELECTRONIC DEVICE

(75) Inventors: Bartley K. Andre, Palo Alto, CA (US); Daniel J. Coster, San Francisco, CA (US); Daniele De Iuliis, San Francisco, CA (US); Richard P. Howarth, San Francisco, CA (US); Jonathan P. Ive, San Francisco, CA (US); Steven Jobs, Palo Alto, CA (US); BJ Watrous, legal representative, Cupertino, CA (US); Duncan Robert Kerr, San Francisco, CA (US); Shin Nishibori, Kailua, HI (US); Matthew Dean Rohrbach, San Francisco, CA (US); Douglas B. Satzger, San Francisco, CA (US); Calvin Q. Seid, Palo Alto, CA (US); Vincent Keane Seid, legal representative, Los Gatos, CA (US); Christopher J. Stringer, Woodside, CA (US); Eugene Antony Whang, San Francisco, CA (US)

(73) Assignee: Apple Inc., Cupertino, CA (US)

( * ) Notice: This patent is subject to a terminal disclaimer.

(21) Appl. No.: 29/327,929

(22) Filed: Nov. 14, 2008

Related U.S. Patent Documents

Reissue of:

(64) Patent No.: Des. 532,011
Issued: Nov. 14, 2006
Appl. No.: 29/208,332
Filed: Jun. 24, 2004

(51) LOC (10) Cl. ..... 14-02

(52) U.S. Cl.
USPC ..... D14/375

(58) Field of Classification Search
USPC ..... D14/371–376, 125–129, 356; 248/917–924, 371, 157, 176.1, 278.1; 341/12; 345/104, 156, 173, 174, 345/901–905; 348/180, 184, 325, 739; 349/1, 2, 11, 62
See application file for complete search history.

(56) References Cited

U.S. PATENT DOCUMENTS

D289,873 S 5/1987 Gemmell et al.

(Continued)

OTHER PUBLICATIONS

U.S. Appl. No. 29/208,301, filed Jun. 24, 2004.

*Primary Examiner* — Deanna L Pratt
(74) *Attorney, Agent, or Firm* — Saidman DesignLaw Group, LLC

(57) CLAIM

We claim the ornamental design for a electronic device, substantially as shown and described.

DESCRIPTION

*Notice: More than one reissue application has been filed for the reissue of U.S. Pat. No. D532,011. The reissue applications are application Ser. Nos. 29/327,929 (the present application), 29/366,469 filed Jul. 26, 2010, 29/366,475 filed Jul. 26, 2010, 29/366,476 filed Jul. 26, 2010, 29/366,477 filed Jul. 26, 2010, 29/366,480 filed Jul. 26, 2010, and 29/366,481 filed Jul. 26, 2010, all of which are divisional reissue of U.S. Pat. No. D532,011.*

*This is a reissue application of our prior U.S. Pat. No. D532,011, having an issue date of Nov. 14, 2006, the entirety of which is expressly incorporated herein by reference.*

Figure 2:
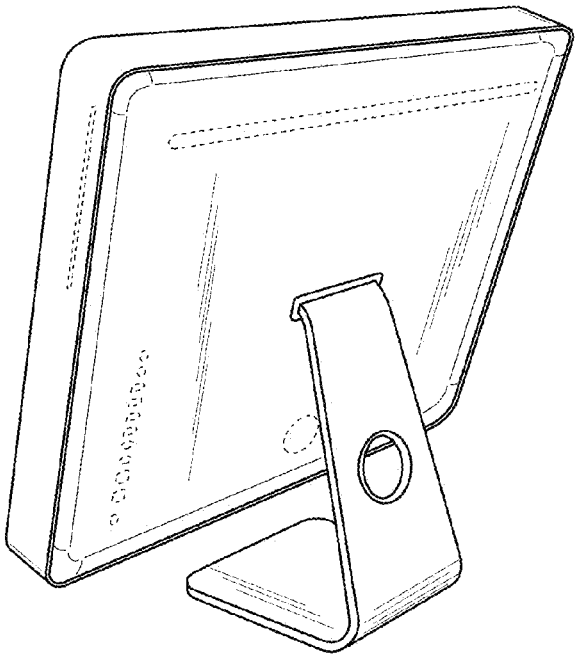
Figure 4:
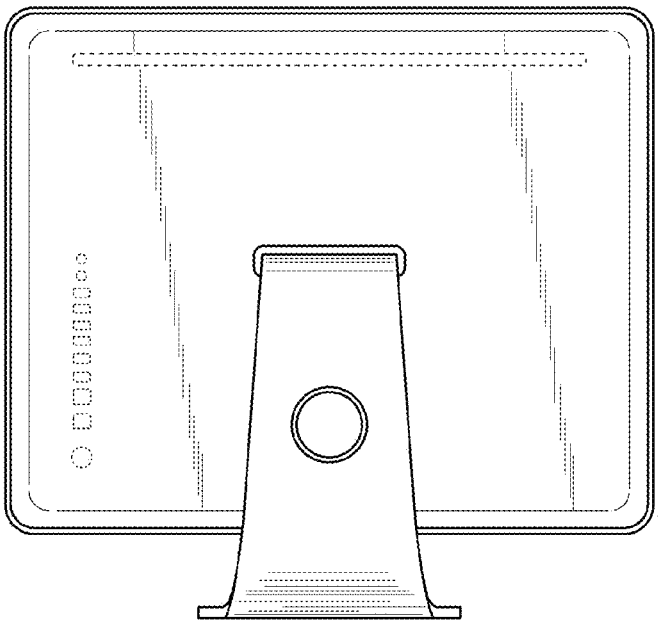

FIG. 1 is a front perspective view of an electronic device in accordance with the present design. The electronic device may correspond to a display device or computer that incorporates a processor and a display device into a single housing;
FIG. 2 is a rear perspective view thereof;
FIG. 3 is a front view thereof;
FIG. 4 is a rear view thereof;
FIG. 5 is a top view thereof;
FIG. 6 is a bottom view thereof;
FIG. 7 is a right side view thereof; and,
FIG. 8 is a left side view thereof.
The broken lines are shown in the views for illustrative purposes only and form no part of the claimed design.

1 Claim, 3 Drawing Sheets

Matter enclosed in heavy brackets [ ] appears in the original patent but forms no part of this reissue; matter printed in italics indicates the additions made by reissue.

*(amended)*

*(amended)*

(56) References Cited

U.S. PATENT DOCUMENTS

| | | | | | |
|---|---|---|---|---|---|
| D294,262 | S | * | 2/1988 | Thies et al. | D14/375 |
| D428,415 | S | * | 7/2000 | Shibata | D14/356 |
| D432,101 | S | * | 10/2000 | Oba | D14/126 |
| D434,763 | S | | 12/2000 | Jobs et al. | |
| D453,022 | S | * | 1/2002 | Oba | D14/374 |
| D456,023 | S | | 4/2002 | Andre et al. | |
| D464,049 | S | * | 10/2002 | Goto | D14/374 |
| D476,335 | S | * | 6/2003 | Miao et al. | D14/375 |
| D486,486 | S | | 2/2004 | Jobs et al. | |
| D487,893 | S | | 3/2004 | Jobs et al. | |
| D488,139 | S | * | 4/2004 | Takami et al. | D14/126 |
| D489,370 | S | | 5/2004 | Jobs et al. | |
| D491,901 | S | * | 6/2004 | Chin et al. | D14/126 |
| D494,971 | S | | 8/2004 | Jobs et al. | |
| D495,332 | S | | 8/2004 | Jobs et al. | |
| D496,040 | S | | 9/2004 | Jobs et al. | |
| D504,889 | S | | 5/2005 | Andre et al. | |
| 7,014,154 | B2 | * | 3/2006 | Jeong et al. | 248/157 |
| D531,631 | S | | 11/2006 | Andre et al. | |
| D532,011 | S | | 11/2006 | Andre et al. | |
| D541,799 | S | | 5/2007 | Andre et a | |
| 2002/0020792 | A1 | * | 2/2002 | Lee | 248/278.1 |
| 2003/0189155 | A1 | * | 10/2003 | Serbinski et al. | 248/371 |
| 2006/0237599 | A1 | * | 10/2006 | Ternus et al. | 248/176.1 |

* cited by examiner

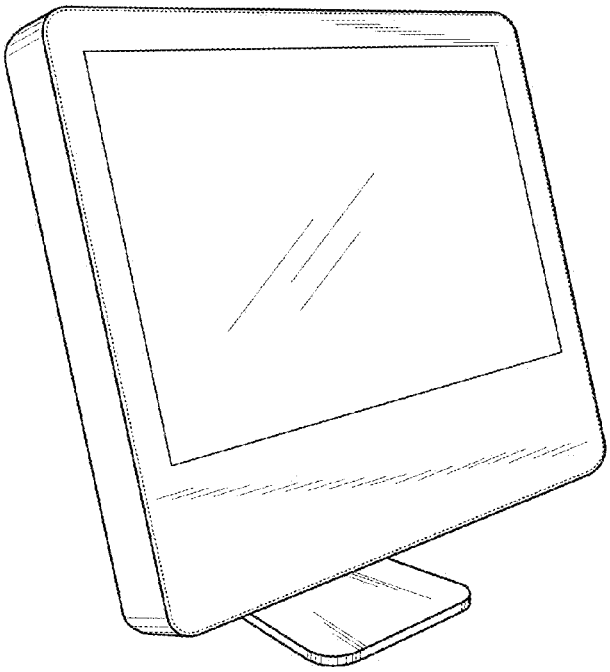
*Fig. 1 (amended)*

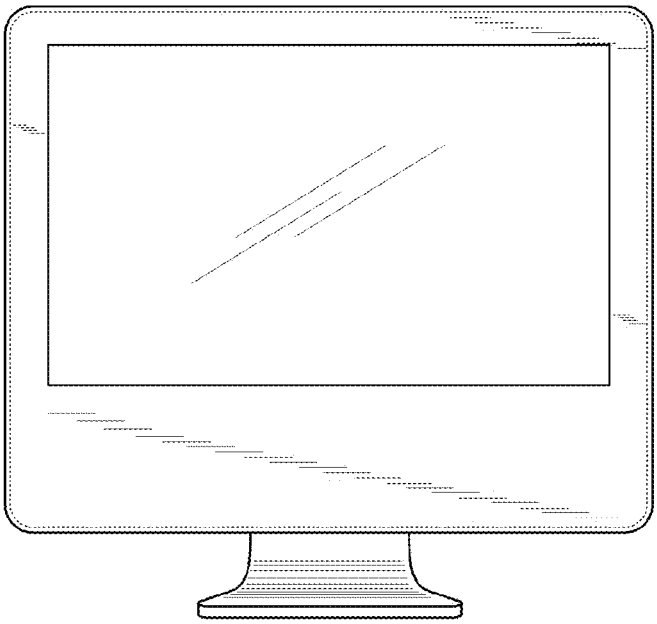
Fig. 3 (amended)

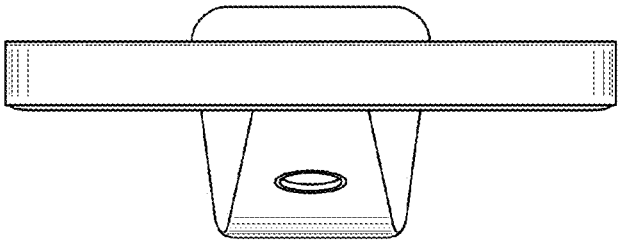
*Fig. 5 (amended)*
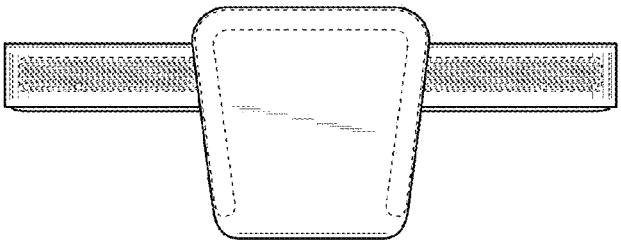
*Fig. 6 (amended)*
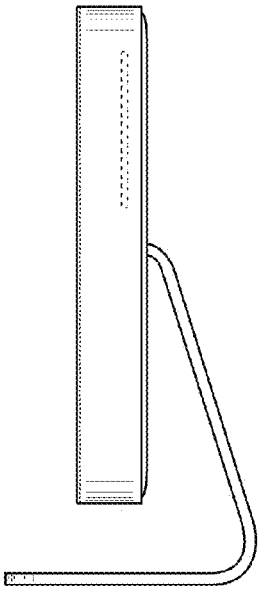
*Fig. 7 (amended)*
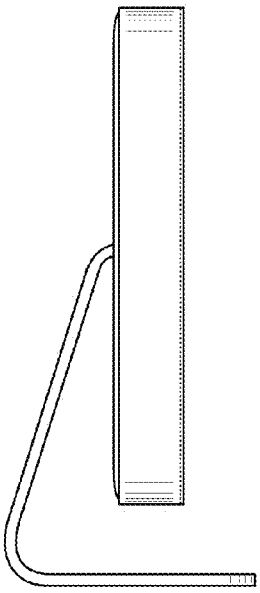
*Fig. 8 (amended)*